(12) United States Patent
Nishimoto et al.

(10) Patent No.: US 12,225,078 B2
(45) Date of Patent: Feb. 11, 2025

(54) ACCEPTANCE JUDGMENT APPARATUS AND ACCEPTANCE JUDGMENT METHOD

(71) Applicant: NIPPON TELEGRAPH AND TELEPHONE CORPORATION, Tokyo (JP)

(72) Inventors: Keita Nishimoto, Musashino (JP); Yukio Toyoshima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 117 days.

(21) Appl. No.: 18/030,140

(22) PCT Filed: Oct. 28, 2020

(86) PCT No.: PCT/JP2020/040464
§ 371 (c)(1),
(2) Date: Apr. 4, 2023

(87) PCT Pub. No.: WO2022/091259
PCT Pub. Date: May 5, 2022

(65) Prior Publication Data
US 2023/0362238 A1    Nov. 9, 2023

(51) Int. Cl.
*H04L 67/1012*    (2022.01)
(52) U.S. Cl.
CPC .............................. *H04L 67/1012* (2013.01)
(58) Field of Classification Search
None
See application file for complete search history.

(56) References Cited

U.S. PATENT DOCUMENTS

2002/0165964 A1    11/2002  Chen et al.
2004/0136368 A1     7/2004  Wakayama et al.
(Continued)

FOREIGN PATENT DOCUMENTS

JP    2004221805 A    8/2004
JP    2005182702 A    7/2005

OTHER PUBLICATIONS

Tomoyuki Kawano, Performance impact of Load Balancers on Server Farms, IPSJ SIG Technical Report, 2007-EVA-21 (5), 2007, pp. 27-34.

*Primary Examiner* — Quang N Nguyen

(57) ABSTRACT

A communication system includes a branching device, a plurality of acceptance judgement apparatuses connected to the branching device, and processing devices each connected respective one of the plurality of acceptance judgement apparatuses and performing processing according to a received signal. The acceptance judgement apparatus includes a reception unit, a determination unit, and a transfer unit. The reception unit receives one of a plurality of signals which have been broadcast by the branching device. The determination unit determines whether or not to transfer a first signal that is a signal which has been received by the reception unit to one of the processing devices connected to the own apparatus on the basis of the first signal and one or more second signals that are one or more signals which have been received by the reception unit before the first signal. The transfer unit transfers the first signal to one of the processing devices connected to the own apparatus when the determination unit determines to transfer the first signal, and discards the first signal when the determination unit determines not to transfer the first signal.

5 Claims, 9 Drawing Sheets

(56) References Cited

U.S. PATENT DOCUMENTS

| | | | | |
|---|---|---|---|---|
| 2007/0239718 A1* | 10/2007 | Baxter | .................... | H04L 65/80 |
| 2016/0073288 A1* | 3/2016 | Patil | ...................... | H04W 68/00 |
| | | | | 370/230 |
| 2020/0196266 A1* | 6/2020 | Tao | ................... | H04W 56/0065 |

* cited by examiner

ACCEPTANCE JUDGMENT APPARATUS AND ACCEPTANCE JUDGMENT METHOD

CROSS-REFERENCE TO RELATED APPLICATIONS

This application is a 371 U.S. National Phase of International Application No. PCT/JP2020/040464, filed on Oct. 28, 2020. The entire disclosure of the above application is incorporated herein by reference.

TECHNICAL FIELD

The present invention relates to an acceptance judgement apparatus and an acceptance judgement method.

BACKGROUND ART

In order to distribute the load of processing requests to processing devices such as servers, for example, a network configuration illustrated in FIG. 11 is often seen. A communication system illustrated in FIG. 11 uses an inline configuration of a load balancer. In this communication system, a communication device A is provided between a network in which a client that request processing exists and servers that perform processing requested by the client. The communication device A functions as a load balancer. The communication device A is, for example, a router. Each of the servers is configured using hardware (H/W) resources and the like. A transmission/reception interface IF is inserted into each port of the communication device A and each port of the server. The transmission/reception interface IF is, for example, a transceiver or a network interface card (NIC). The communication device A distributes the processing request data transmitted from the client to each server.

In the network configuration of the related art illustrated in FIG. 11, the communication device A distributes processing to a plurality of servers. That is, the communication device A performs path control of traffic of processing requests to the servers and responses from the servers. Therefore, in the configuration illustrated in FIG. 11, the performance of the communication device A is limited by the communication method of the interface and the switching performance of the switch fabric. Therefore, every time the performance requirement (for example, communication speed) increases, it is necessary to renew not only the communication device that functions as a load balancer but also all the interface units that connect to the servers (see, for example, Non Patent Literature 1).

CITATION LIST

Non Patent Literature

Non Patent Literature 1: Tomoyuki KAWANO, "Performance impact of Load Balancers on Server Farms," Information Processing Society of Japan, Research Report System Evaluation (EVA), 2007-EVA-21, p. 27-34, 2007

SUMMARY OF INVENTION

Technical Problem

As described above, in the network configuration of the related art, it is necessary to renew a communication device that functions as a load balancer and an interface thereof every time a requested communication speed is improved.

In view of the above circumstances, an object of the present invention is to provide an acceptance judgement apparatus and an acceptance judgement method capable of transferring a signal to a processing device that performs processing among a plurality of processing devices without requiring a communication device that distributes signals and an interface thereof to be renewed in order to improve a communication speed.

Solution to Problem

One aspect of the present invention is an acceptance judgement apparatus in a communication system including a branching device, a plurality of acceptance judgement apparatuses connected to the branching device, and processing devices each connected to respective one of the plurality of acceptance judgement apparatuses and performing processing according to a received signal, the acceptance judgement apparatus including: a reception unit (hereinafter also referred to as "receiver") configured to receive one of a plurality of signals which have been broadcast by the branching device; a determination unit (hereinafter also referred to as "determiner") configured to determine whether or not to transfer a first signal that is a signal which has been received by the reception unit to one of the processing devices connected to own apparatus on the basis of the first signal and one or more second signals that are one or more signals which have been received by the reception unit before the first signal; and a transfer unit (hereinafter also referred to as "transfer device") configured to transfer the first signal to one of the processing devices connected to the own apparatus when the determination unit determines to transfer the first signal, and to discard the first signal when the determination unit determines not to transfer the first signal.

One aspect of the present invention is an acceptance judgement method of an acceptance judgement apparatus in a communication system including a branching device, a plurality of acceptance judgement apparatuses connected to the branching device, and processing devices each connected to respective one of the plurality of acceptance judgement apparatuses and performing processing according to a received signal, the acceptance judgement method including: a reception step of receiving one of a plurality of signals which have been broadcast by the branching device; a determination step of determining whether or not to transfer a first signal that is a signal which has been received in the reception step to one of the processing devices connected to own apparatus on the basis of the first signal and one or more second signals that are one or more signals which have been received in the reception step before the first signal; and a transfer step of transferring the first signal to one of the processing devices connected to the own apparatus upon determining to transfer the first signal in the determination step, and discarding the first signal upon determining not to transfer the first signal in the determination step.

Advantageous Effects of Invention

According to the present invention, it is possible to transfer a signal to a processing device that performs processing among a plurality of processing devices without requiring a communication device that distributes signals and an interface thereof to be renewed in order to improve a communication speed.

DESCRIPTION OF EMBODIMENTS

Hereinafter, embodiments of the present invention will be described in detail with reference to the drawings.

In the present embodiment, a request signal from a client is broadcast to all of a plurality of servers using an optical splitter or the like. An acceptance determiner of each server that has received the broadcast request signal determines whether the own server processes the request signal. Hereinafter, processing of the received signal by the server is referred to as "accepting." By determining whether or not the acceptance determiner of each server accepts the request signal, a load balancer and interfaces accompanying the load balancer, which are conventionally necessary, become unnecessary. Thereby, even when the requested communication speed is improved, it is not necessary to renew devices such as load balancers that have been conventionally used.

First Embodiment

Figure 1:
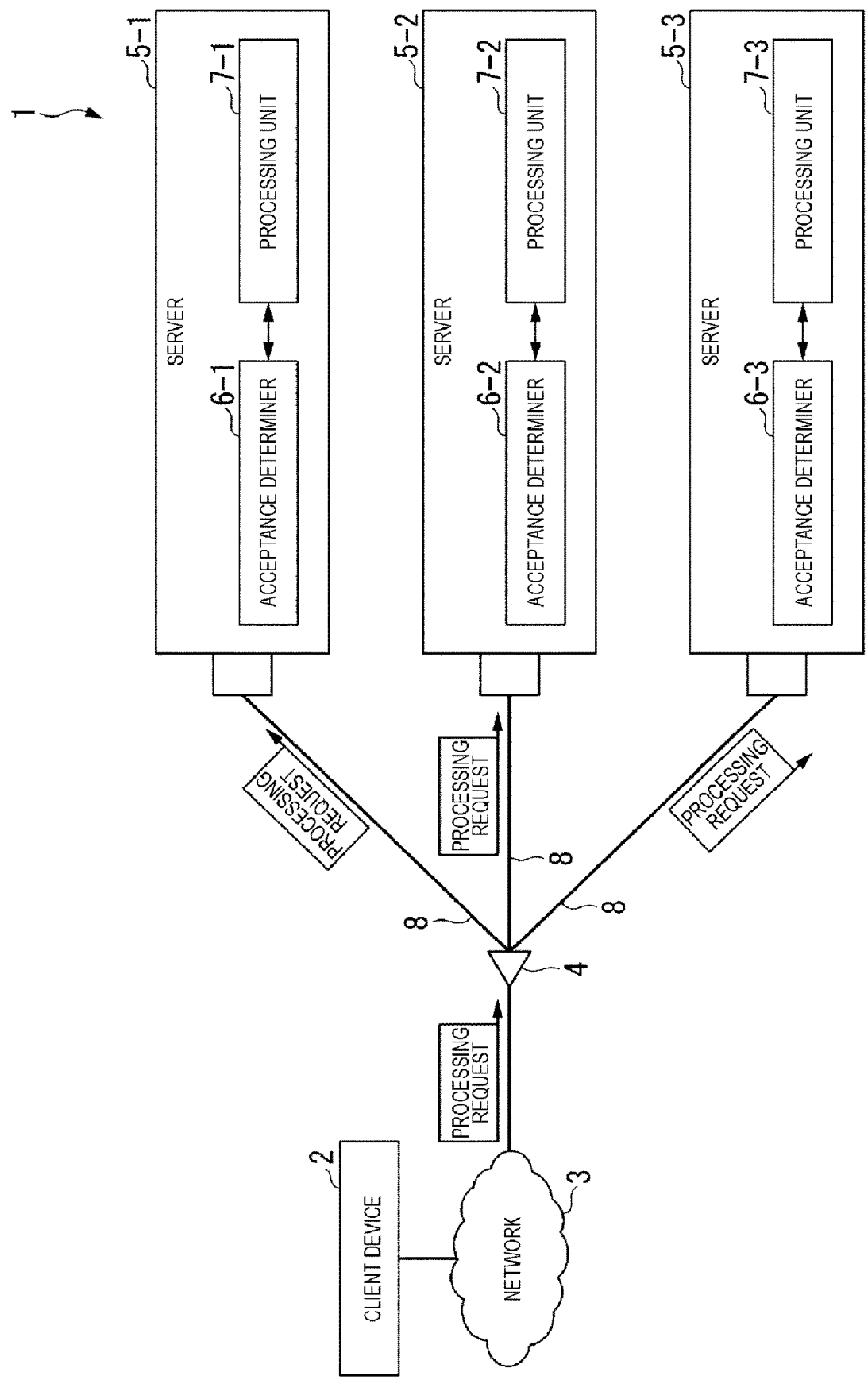
FIG. 1 is a diagram illustrating a configuration example of a communication system in a first embodiment.

FIG. 1 is a diagram illustrating a configuration of a communication system 1 according to a first embodiment of the present invention. The communication system 1 includes a client device 2, a network 3, an optical splitter 4, and N (N is an integer of 2 or more) servers 5. FIG. 1 illustrates an example of N=3. The n-th (n is an integer of 1 or more and N or less) server 5 is referred to as a server 5-$n$.

The client device 2 is connected to the network 3. The client device 2 may be a device in the network 3. The client device 2 transmits and receives an optical signal. The client device 2 is a device that is a transmission source of a processing request signal to the server 5. The optical splitter 4 is an example of a branching device that branches a signal addressed to the server 5 into a plurality of signals. The optical splitter 4 splits the signal received from the network 3 into N signals, broadcasts the branched signals, and outputs the branched signals to each of the servers 5-1 to 5-N. In addition, the optical splitter 4 multiplexes response signals which have been transmitted from the servers 5-1 to 5-N, and outputs the multiplexed response signals to the network 3.

The server 5 is an example of a processing device that processes a signal. The server 5 includes hardware such as a central processing unit (CPU), a memory, a field-programmable gate array (FPGA), and a graphics processing unit (GPU). It is assumed that all the servers 5 are configured by the same hardware. The server 5 includes an acceptance determiner 6 and a processing unit 7. The acceptance determiner 6 is an example of an acceptance judgement apparatus. The acceptance determiner 6 may be an external device connected to the server 5. Hereinafter, the acceptance determiner 6 included in the server 5-$n$ (n is an integer of 1 or more and N or less) is referred to as an acceptance determiner 6-$n$, and the processing unit 7 included in the server 5-$n$ is referred to as a processing unit 7-$n$. The optical splitter 4 and each acceptance determiner 6 are connected by an optical fiber 8.

The acceptance determiner 6 receives a signal which has transmitted through the optical fiber 8. The acceptance determiner 6 determines whether or not the server 5 including the acceptance determiner 6 itself processes the signal. That is, the acceptance determiner 6-$n$ determines whether or not the server 5-$n$ accepts the received signal. When acceptance is determined, the acceptance determiner 6-$n$ transfers the received signal to the processing unit 7-$n$. The acceptance determiner 6 determines a transmission timing of a response signal transmitted from the processing unit 7 that accepts the signal. The acceptance determiner 6-$n$ outputs the response signal which has been output from the processing unit 7-$n$ to the optical fiber 8 at the determined transmission timing.

The processing unit 7-$n$ receives the signal which has been transferred by the acceptance determiner 6-$n$ and performs processing requested by the signal. When transmitting the processing result as a response signal, the processing unit 7-$n$ outputs the response signal to the acceptance determiner 6-$n$.

Figure 2:
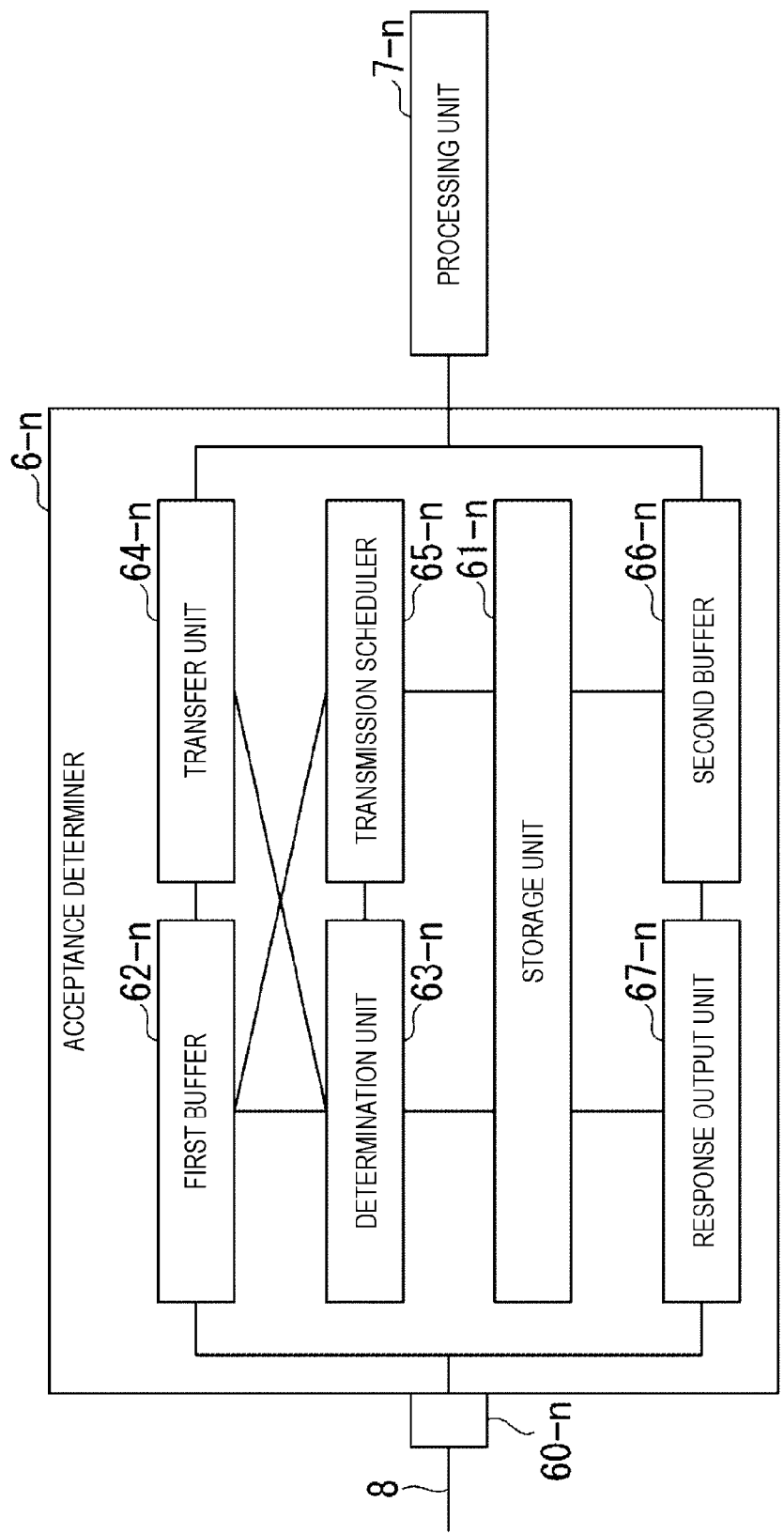
FIG. 2 is a diagram illustrating a configuration of an acceptance determiner according to the first embodiment.

FIG. 2 is a block diagram illustrating a configuration of the acceptance determiner 6. The acceptance determiner 6 includes a transmission/reception interface 60, a storage unit 61, a first buffer 62, a determination unit 63, a second buffer 66, a transmission scheduler 65, and a response output unit (hereinafter also referred to as "response transmitter") 67. The transmission/reception interface 60, the storage unit 61, the first buffer 62, the determination unit 63, the second buffer 66, the transmission scheduler 65, and the response output unit 67 included in the acceptance determiner 6-$n$ are referred to as a transmission/reception interface 60-$n$, a storage unit 61-$n$, a first buffer 62-$n$, a determination unit 63-$n$, a second buffer 66-$n$, a transmission scheduler 65-$n$, and a response output unit 67-$n$, respectively.

The transmission/reception interface 60-$n$ is, for example, a transceiver or an NIC. The transmission/reception interface 60-$n$ has functions of a reception unit that receives a signal and a transmission unit that transmits a signal. The transmission/reception interface 60-$n$ receives a signal which has transmitted through the optical fiber 8 and converts the received signal from an optical signal into an electrical signal. The transmission/reception interface 60-$n$ outputs the signal which has been converted into the electrical signal to the first buffer **62-*n*. In addition, the transmission/reception interface 60-*n* converts the response signal which has been output from the response output unit 67-*n* from an electrical signal into an optical signal. The transmission/reception interface 60-*n* outputs the response signal converted into the optical signal to the optical fiber 8. The storage unit 61-*n* stores various types of information. Note that each of the determination unit 63-*n*, the transmission scheduler 65-*n*, and the response output unit 67-*n* may include a part of the storage unit 61-*n* therein. The first buffer 62-*n* temporarily stores the signal which has been received by the transmission/reception interface 60-*n***.

The determination unit **63-*n* determines whether or not the server 5-*n* including the determination unit itself accepts the signal which has been received by the transmission/reception interface 60-*n*. The determination unit 63-*n* makes this determination on the basis of the received signal. When the determination unit 63-*n* determines to accept the signal, the transfer unit 64-*n* reads the signal from the first buffer 62-*n* and transfers the read signal to the processing unit 7-*n*. When the determination unit 63-*n* determines not to accept the signal, the transfer unit 64-*n* discards the signal stored in the first buffer 62-*n***.

The transmission scheduler 65 is an example of a timing determination unit that determines a transmission timing of a response signal transmitted from the processing unit 7. The transmission scheduler **65-*n* calculates a transmission timing of the response signal transmitted from the processing unit 7 on the basis of the received signal, and writes the calculated transmission timing in the storage unit 61-*n*. The second buffer 66-*n* temporarily stores the response signal received from the processing unit 7-*n*. The response output unit 67-*n* reads the response signal which has been transmitted from the processing unit 7-*n* from the second buffer 66-*n*, and outputs the read response signal to the optical fiber 8 at the transmission timing calculated by the transmission scheduler 65-*n***.

An operation of the communication system 1 will be described with reference to FIGS. 1 and 2. The optical splitter 4 receives the processing request signal which has been transmitted by the client device 2 from the network 3 and branches the received processing request signal into N signals. The optical splitter 4 broadcasts the N-branched processing request signals to the acceptance determiner 6 of each server 5.

The acceptance determiners 6 of the respective servers 5 all have the same function. It is desirable that the optical splitter 4 and the acceptance determiner 6 of each server 5 be connected by an optical fiber 8 having a substantially equal distance. In this case, it is assumed that the same processing request signals arrive at almost the same timing at all the acceptance determiners 6-1 to 6-N. However, the optical splitter 4 and the acceptance determiner 6 of each server 5 are not necessarily the same distance.

The first buffer 62 of each acceptance determiner 6 stores the processing request signal which has been received by the transmission/reception interface 60. The determination unit 63 determines whether or not to accept the received processing request signal according to an acceptance determination method to be described later. When the determination unit **63-*n* determines to accept the processing request signal, the transfer unit 64-*n* reads the received processing request signal from the first buffer 62-*n*, and outputs the read processing request signal to the processing unit 7-*n* of the server 5-*n***.

When receiving the processing request signal from the acceptance determiner **6-*n*, the processing unit 7-*n* performs specific processing according to the information included in the received processing request signal, and outputs a processing response signal in which output data by the processing is set to the acceptance determiner 6-*n*. The second buffer 66-*n* of the acceptance determiner 6-*n* stores the processing response signal received from the processing unit 7-*n*. The response output unit 67-*n* transmits the processing response signal stored in the second buffer 66-*n* to the client device 2 via the optical splitter 4 at the transmission timing calculated by the transmission scheduler 65-*n***.

Figure 3:
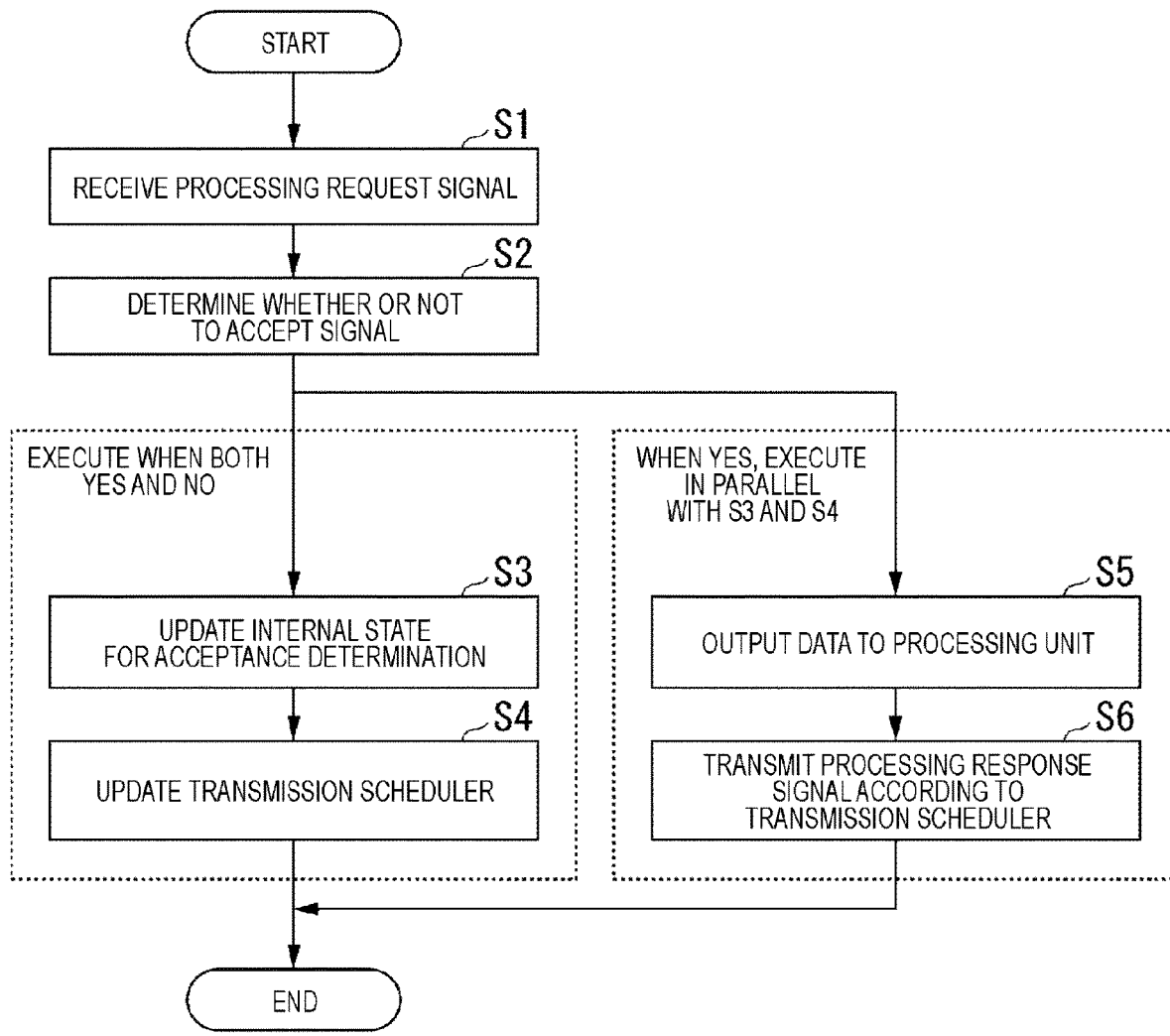
FIG. 3 is a flowchart illustrating processing of the acceptance determiner according to the first embodiment.

FIG. 3 is a flowchart illustrating processing of the acceptance determiner 6. First, the acceptance determiner 6 receives a processing request signal Mi (i is an integer of 1 or more) (step S1). The first buffer 62 stores the received processing request signal Mi. The determination unit 63 determines whether or not to accept the processing request signal Mi on the basis of the received processing request signal Mi and processing request signals M0 to M(i−1) received in the past by that point in time (step S2). That is, the determination unit **63-*n* determines whether or not the server 5-*n*** processes the processing request signal Mi. An example of the determination will be described later.

After the determination processing of step S2, the determination unit 63 updates the internal state related to the determination processing of step S2 regardless of whether the determination result is acceptance (YES) or not (NO) (step S3). When step S3 is completed, the transmission scheduler 65 of the acceptance determiner 6 performs transmission scheduling of a processing response signal Ri for the processing request signal Mi (step S4). The transmission scheduler 65 performs scheduling so that the processing response signal Ri can be separated even after the processing response signal Ri is multiplexed with another signal by the optical splitter 4.

When the determination unit **63-*n* determines to accept the signal (YES) in step S2, the acceptance determiner 6-*n* performs the processing of steps S5 and S6 in parallel with steps S3 and S4 described above. The transfer unit 64-*n* of the acceptance determiner 6-*n* reads the processing request signal Mi received in step S1 from the first buffer 62-*n* and outputs the processing request signal Mi to the processing unit 7-*n* (step S5). The processing unit 7-*n* of the server 5-*n* performs processing on the basis of the processing request signal Mi received from the acceptance determiner 6-*n***.

The processing unit **7-*n* transmits the processing response signal Ri that is a result of processing based on the processing request signal Mi. The second buffer 66-*n* of the acceptance determiner 6-*n* stores the processing response signal Ri which has been transmitted from the processing unit 7-*n*. The response output unit 67-*n* transmits the processing response signal Ri stored in the second buffer 66-*n* to the client device 2 according to the transmission schedule updated in step S4 (step S6). Therefore, no collision occurs between the processing response signal Ri and the processing request signal transmitted from another acceptance determiner 6**.

A specific example of the determination processing in step S2 will be described. The simplest example of the determination method used in the determination processing in step S2 is a round robin method. In the storage units 61 of all the acceptance determiners 6, information of the number N of the servers 5 connected to the system is stored in advance. Further, the storage unit 61 of the acceptance determiner **6-*n* stores a server ID of the server 5-*n* including the acceptance determiner 6-*n* itself. It is assumed that the server ID of the server 5-*n* is n. When the i-th (i is an integer of 1 or more) processing request signal Mi is received in step S1, the determination unit 63 of each acceptance determiner 6** performs a calculation (i+n) % N for obtaining a remainder by dividing (i+n) by N.

The determination unit 63-*n* determines to accept the signal when the calculation result is 0. In this case, the transfer unit 64-*n* executes the processing of step S5. That is, the transfer unit 64-*n* outputs the processing request signal Mi received in step S1 to the processing unit 7-*n*, and the processing unit 7-*n* executes processing based on the processing request signal Mi.

The determination unit 63-*n* determines not to accept the signal when the calculation result is not 0. In this case, the transfer unit 64-*n* discards the processing request signal Mi received in step S1. Thereby, only the processing unit 7 of one server 5 among the N servers 5 can perform processing on the processing request signal, and the servers 5 performing the processing can be switched in order. In a case where such a round robin method is used, in step S3, the acceptance determiner 6 counts up a value i of a counter representing the number of received processing request signals. In this manner, the server 5 that processes the i-th processing request signal received after the predetermined timing can make an acceptance determination on the basis of a predetermined static method.

Figure 4:
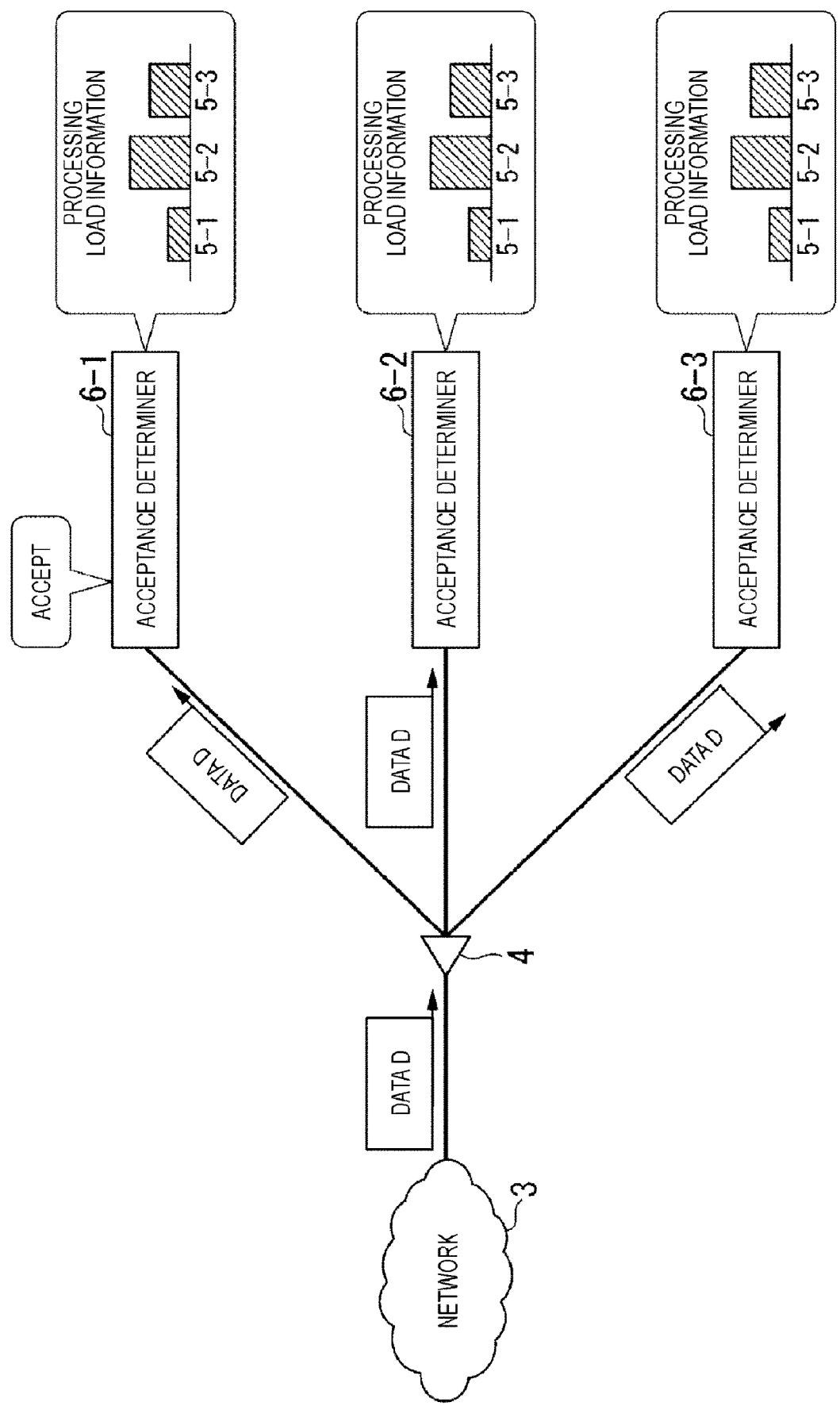
FIG. 4 is a diagram illustrating an example of determination processing of the acceptance determiner according to the first embodiment.

In addition to a static method such as round robin, a dynamic method such as a dynamic ratio method can also be applied to the determination processing used in step S2. FIG. 4 is a diagram illustrating an example of determination processing using the dynamic ratio method. As illustrated in FIG. 4, the storage unit 61 of each acceptance determiner 6 stores processing load information indicating the processing load of each of all the servers 5 connected to the system. The processing load information is, for example, information such as a CPU usage rate and a memory usage amount.

When the dynamic ratio method is used, it is assumed that each acceptance determiner 6 can predict a processing load generated in the server 5, a processing completion time in the server 5, and a data amount of the processing response signal Ri from the server 5 when the server 5 performs processing on the basis of data D set in the processing request signal Mi (see, for example, Reference 1). In a case where this assumption holds, when each acceptance determiner 6 receives the broadcast processing request signal Mi, the determination unit 63 refers to the processing load information stored in the storage unit 61, and selects the server 5 having the smallest load among the servers 5-1 to 5-N as the server that processes the processing request signal Mi. The determination unit 63 may select the server 5 having the smallest current prediction load, or may select the server 5 having the smallest total prediction load from a certain point in time to the present. In the case of FIG. 4, the server 5-1 is selected. The determination unit 63-*n* determines to accept the selected server 5 when the selected server 5 is the server 5-*n* connected thereto, and determines not to accept the selected server 5 when the selected server 5 is another server 5-*j*. Also in this method, similarly to the round robin method described above, the acceptance determiner 6 can make a determination independently.

(Reference 1) Amaris, Marcos, et al., "A Comparison of GPU Execution Time Prediction using Machine Learning and Analytical Modeling", 2016 IEEE 15th International Symposium on Network Computing and Applications (NCA), IEEE, pp. 326-333, 2016.

Figure 5:
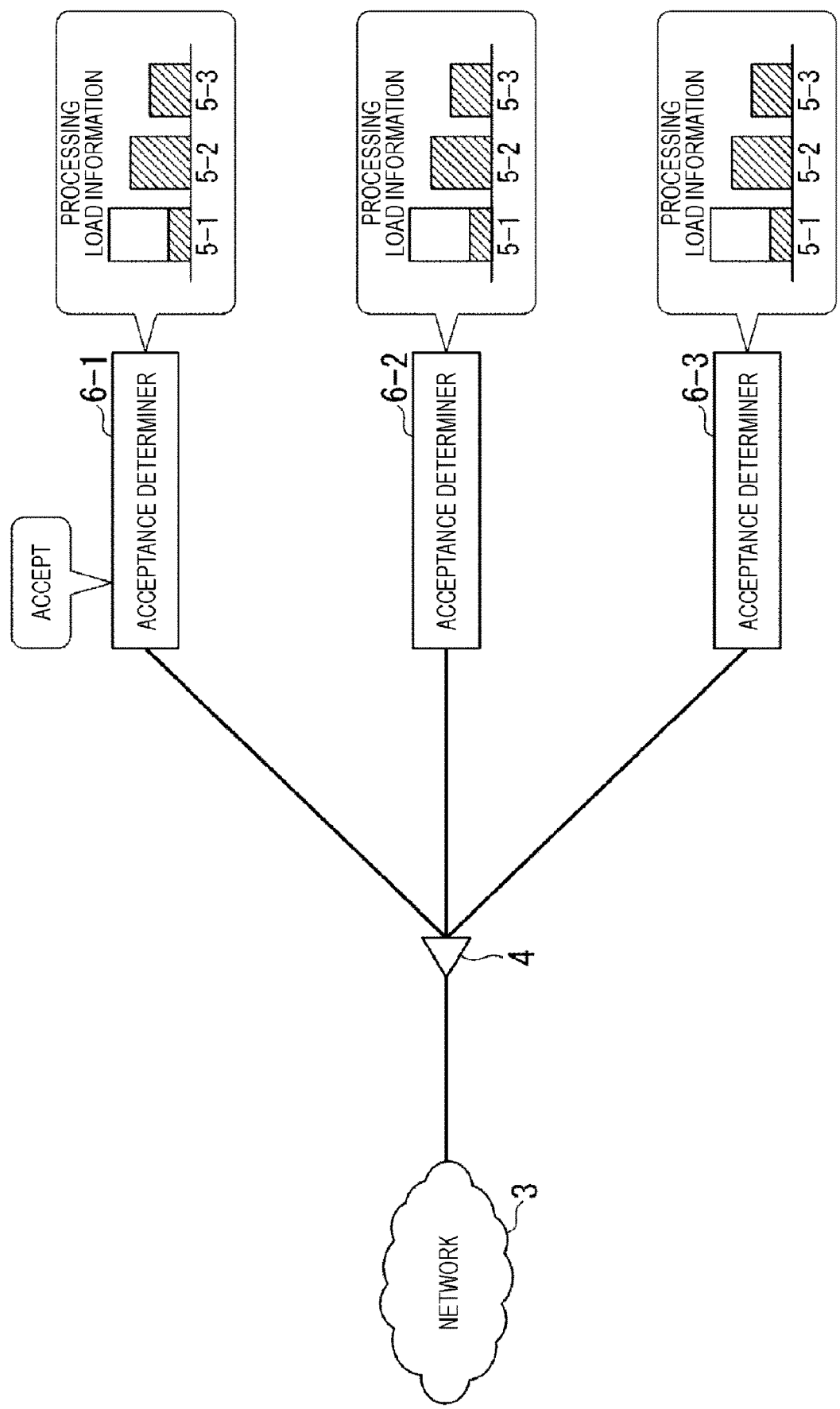
FIG. 5 is a diagram illustrating an example of updating an internal state of the acceptance determiner according to the first embodiment.

FIG. 5 is a diagram illustrating an example of update of the internal state by the acceptance determiner 6 after the determination processing by the server processing load method is performed. In step S3, the determination unit 63 updates the processing load of each server 5 indicated by the processing load information.

Specifically, the determination unit 63 calculates, based on the data D set in the received processing request signal Mi, load information indicating a processing load that is predicted to be newly borne by the server 5 that processes the processing request signal Mi. The determination unit 63 updates the current processing load information stored in the storage unit 61 using the calculated load information.

For example, in step S2, as illustrated in FIG. 4, in a case where the server 5-1 is selected to process the processing request signal Mi, the determination unit 63 calculates the load information of the prediction newly borne by the server 5-1 on the basis of the information set in the processing request signal Mi. The determination unit 63 updates the processing load information by adding the calculated predicted load information to the load information of the server 5-1 among the load information of the servers 5-1 to 5-N indicated by the current processing load information. Note that, in a case where the server 5 having the smallest current prediction load is selected in step S2, the determination unit 63 also performs update for subtracting the load information of the server 5 added to the processing request signal to which the processing response signal has already been output.

An important point in the determination processing in step S2 is that the determination unit 63 of each acceptance determiner 6 independently determines whether or not to accept a newly received processing request signal on the basis of the processing request signals which have been broadcast to all the acceptance determiners 6-1 to 6-N. That is, the acceptance determiner 6 can uniquely determine the server 5 that processes the processing request signal without cooperation with another acceptance determiner 6 or an instruction from another device. At the time of initialization or the like, it is necessary to perform setting processing on all the acceptance determiners 6. For example, when the round robin method is used, the value of a counter i representing the number of received processing request signal is initialized for all the acceptance determiners 6. In addition, when the dynamic ratio method is used, the processing load information of each server 5 is initialized for all acceptance determiners 6.

Next, a specific example of transmission scheduling in step S4 will be described. Here, an example of transmission scheduling in a case where time division multiplexing (TDM) is used will be described.

Figure 6:
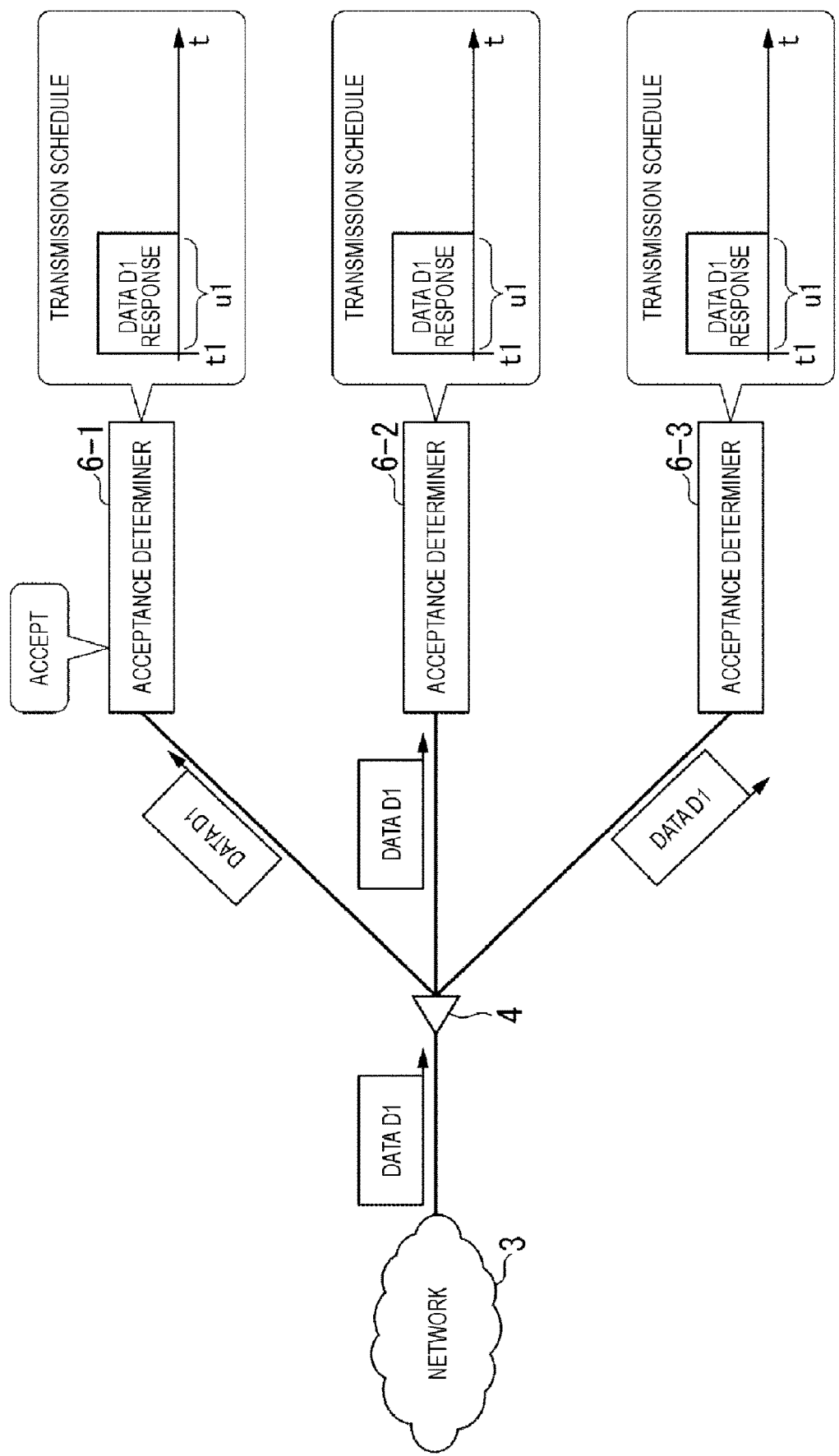
FIG. 6 is a diagram illustrating an example of transmission scheduling according to the first embodiment.
Figure 7:
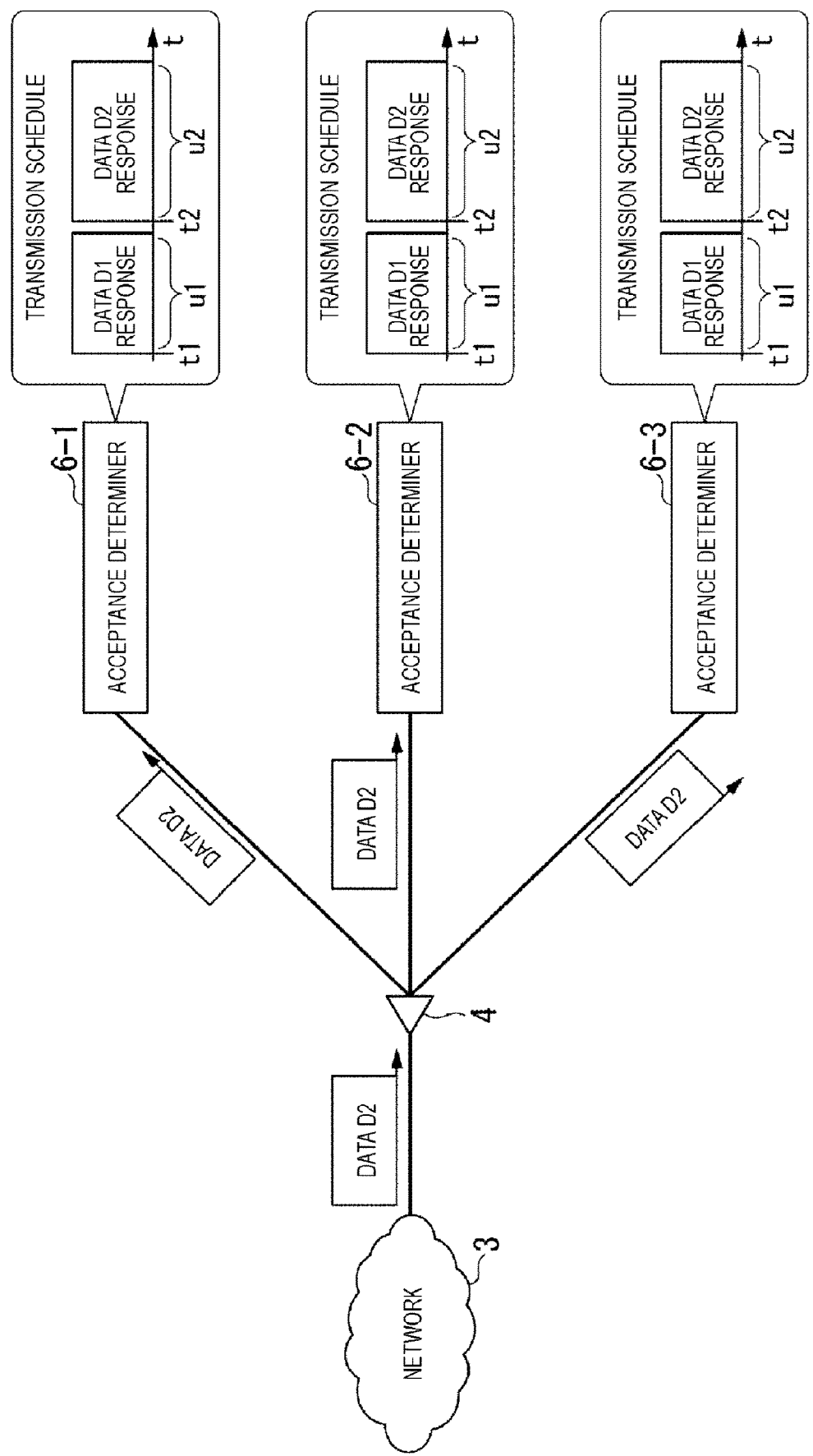
FIG. 7 is a diagram illustrating an example of transmission scheduling according to the first embodiment.

FIGS. 6 and 7 are diagrams illustrating an example of transmission scheduling using TDM. Each of the acceptance determiners 6-1 to 6-N transmits a processing response signal to the network 3 at the same wavelength. Therefore, as illustrated in FIG. 6, based on data D1 set in the received processing request signal, the transmission scheduler 65 of each acceptance determiner 6 predicts a time t1 at which the processing requested by the processing request signal is completed and a data amount d1 of a data D1 response set in the processing response signal. The transmission scheduler 65 of each acceptance determiner 6 registers the predicted time t1 and a transmission time u1 predicted from the data amount d1 in the transmission schedule stored in the storage unit 61. The transmission time is a time from the start to the end of transmission of the processing response signal.

When another processing response signal is allocated to the predicted time and transmission time, each acceptance determiner 6 allocates the processing response signal at a time not overlapping with another processing response signal as illustrated in FIG. 7. For example, after registering the transmission schedule as illustrated in FIG. 6, the acceptance determiner 6 receives the processing request signal in which data D2 is set. Based on the data D2 set in the received processing request signal, the transmission scheduler 65 of each acceptance determiner 6 predicts a time t2 at which the processing requested by the processing request signal is completed and a data amount d2 of the data D2 response set in the processing response signal. The transmission scheduler 65 of each acceptance determiner 6 registers the predicted time t2 and a transmission time u2 predicted from the data amount d2 in the transmission schedule stored in the storage unit 61 so as not to overlap with the processing response signal of the data D1 response.

Even when wavelength division multiplexing (WDM) transmission using a plurality of wavelengths is performed or when another multiplexing method is used, the transmission scheduler 65 of each acceptance determiner 6 predicts a processing completion time t and a data amount d of the processing response signal on the basis of the processing request signal, and schedules the processing response signal, as described above. In addition to the scheduling based on the prediction as described above, the transmission scheduler 65 of the acceptance determiner 6 may perform fixed scheduling in which a time slot is periodically allocated to each server 5.

Note that, in a case where the optical splitter 4 and the acceptance determiners 6 of the respective servers 5 are connected by the optical fibers 8 at substantially equal distances, the time required for the optical signals output from the respective acceptance determiners 6 to arrive at the optical splitter 4 is substantially the same. Therefore, each acceptance determiner 6 may transmit the processing response signal at the transmission timing of the transmission schedule. When there is a large difference in the distance between the optical splitter 4 and the acceptance determiner 6 of each server 5, there is a difference in time until the optical signal transmitted from each acceptance determiner 6 arrives at the optical splitter 4. Therefore, an adjustment time considering the time difference may be set in advance in each acceptance determiner 6, and the response output unit 67 may transmit the processing response signal at a timing obtained by adjusting the transmission timing determined by the transmission schedule according to the adjustment time. Alternatively, the transmission scheduler 65 may determine the transmission start timing of the processing response signal to be a timing at which a time longer than a maximum time difference has elapsed from the transmission end of the immediately preceding processing response signal.

According to the present embodiment, it is possible to distribute a processing load among a plurality of servers without using a high-performance load balancer.

Second Embodiment

In a second embodiment, some of the functions described in the first embodiment are omitted, and the power consumed by the acceptance determiner 6 is reduced. The second embodiment will be described with a focus on the differences from the first embodiment.

The acceptance determiner 6 temporarily holds the processing request signal in the first buffer 62 when making an acceptance determination in step S2 described in the first embodiment. Therefore, the acceptance determiner 6 needs to include the first buffer 62 having a size proportional to the processing time in step S2. However, there is a concern that the power consumption of a large-capacity buffer is large. In order to solve this problem, the determination unit 63 of the acceptance determiner 6 selects the server 5 to be accepted next after performing the processing in step S4 of FIG. 3 in the first embodiment, and holds the result in the inside or in the storage unit 61. When the processing request signal is received next time, the determination unit 63 refers to the held result. Thereby, the processing time of step S2 can be shortened. This leads to a reduction in the required buffer amount.

The present embodiment is applicable to a case where a determination of acceptance of a processing request signal can be made before reception of the signal, for example, a case where round robin or a dynamic ratio method is used.

Third Embodiment

In a third embodiment, the response signal which has been output from the acceptance determiner is also transmitted to another acceptance determiner. The second embodiment will be described with a focus on the differences from the first embodiment.

In the first embodiment, the transmission scheduler 65 of each acceptance determiner 6 predicts the processing completion time of each server 5 on the basis of the broadcast processing request signal, and updates the internal information and performs transmission scheduling on the basis of the predicted completion time. However, in a case where the actual completion time greatly deviates from the prediction, there is a likelihood that these pieces of information will deviate from the actual state, and efficient operation will be hindered.

In order to prevent the above problem, in the third embodiment, an optical hub is used instead of the optical splitter 4. The optical splitter 4 outputs a signal input from one specific input port to a plurality of output ports. On the other hand, the optical hub used in the present embodiment is an optical device that outputs a signal input from an arbitrary port among a plurality of ports from all ports other than the port that has input the signal. The optical hub can include a plurality of optical splitters, for example, as described in Reference 2.

(Reference 2) J. Mizusawa, "Optical Hub Network Design for CWDM Access Network," 2008 Australasian Telecommunication Networks and Applications Conference, pp. 5-9, 2008.

Figure 8:
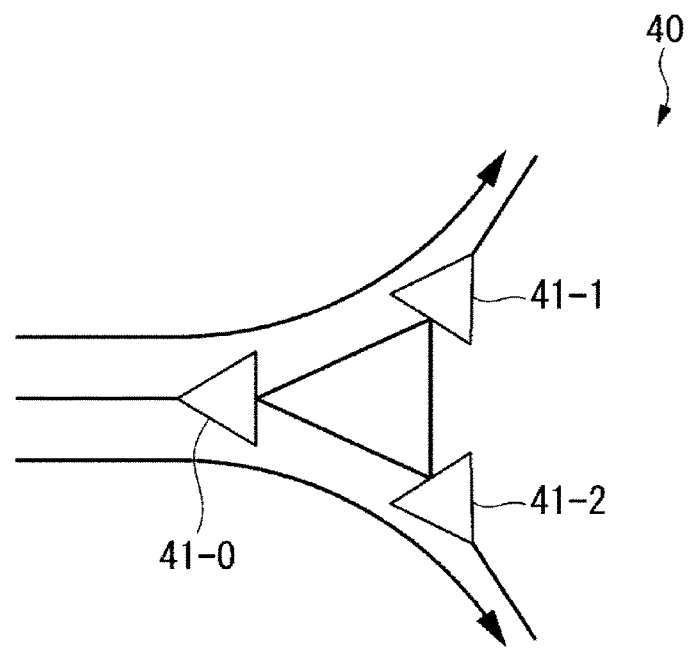
FIG. 8 is a diagram illustrating a configuration example of an optical hub according to a third embodiment.

FIG. 8 is a diagram illustrating a configuration example of an optical hub 40. The optical hub 40 illustrated in FIG. 8 includes (N+1) optical splitters 41. The (N+1) optical splitters 41 are referred to as optical splitters 41-0 to 41-N. In the drawing, an example of N=2 is illustrated. The optical splitter 41-0 branches the light input from the network 3 into N pieces, and outputs the branched light to the optical splitters 41-1 to 41-N. In addition, the optical splitter 41-0 multiplexes the light input from the optical splitters 41-1 to 41-N, and outputs the multiplexed light to the network 3. The optical splitter 41-n branches the light input from the acceptance determiner 6-n into N pieces, and outputs the branched light to the optical splitters 41-0 to 41-N excluding the optical splitter 41-n. In addition, the optical splitter 41-n multiplexes the light input from the optical splitters 41-1 to 41-N excluding the optical splitter 41-n, and outputs the multiplexed light to the acceptance determiner 6-n.

Figure 9:
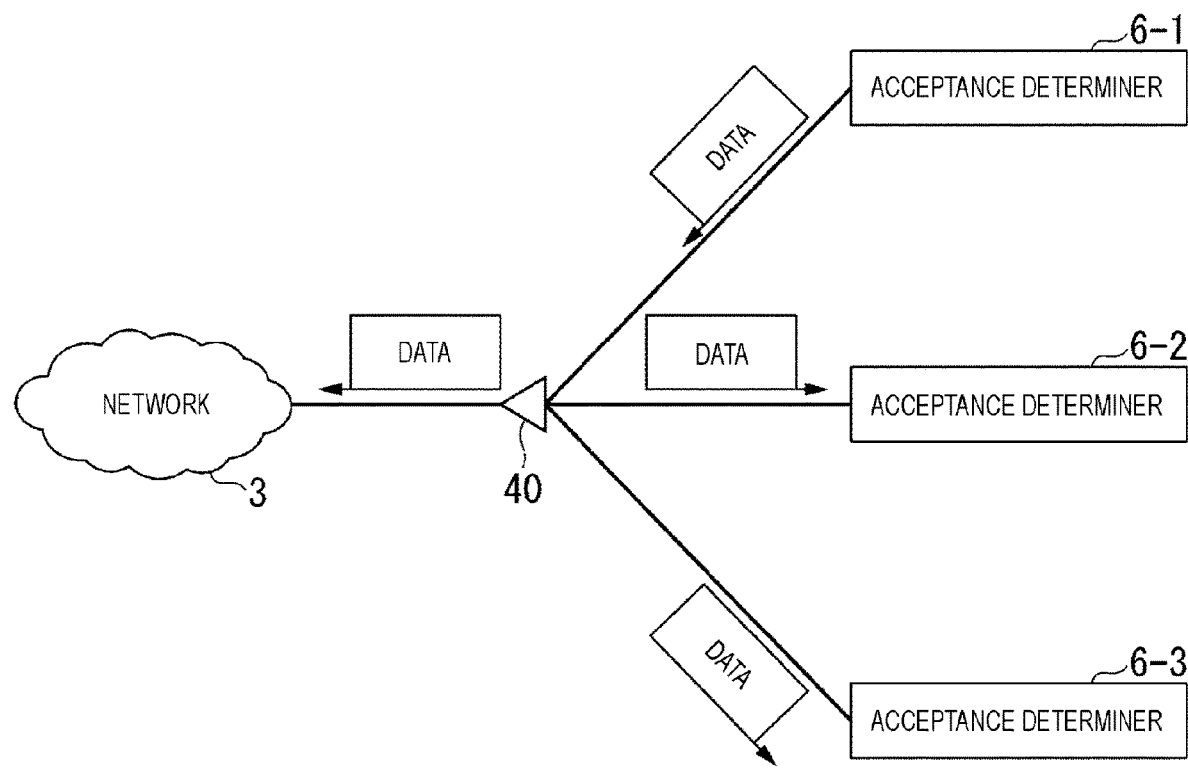
FIG. 9 is a diagram illustrating transmission of a signal output from an acceptance determiner according to the third embodiment.

By using the optical hub 40 instead of the optical splitter 4, the processing response signal transmitted by the acceptance determiner 6 in step S6 of the first embodiment illustrated in FIG. 3 reaches not only the network 3 but also all the acceptance determiners 6 other than the acceptance determiner 6 that is the transmission source of the processing response signal. FIG. 9 is a diagram illustrating transmission of data output from the acceptance determiner 6.

As illustrated in FIG. 9, the acceptance determiner 6-1 outputs, from the processing unit 7-1, a processing response signal in which data requested by the processing request signal is set. The optical hub 40 branches the processing response signal received from the acceptance determiner 6-1, and outputs the processing response signal to the network 3 and the acceptance determiners 6-2 and 6-3. The transmission/reception interfaces 60 of the acceptance determiners 6-2 and 6-3 receive the processing response signal. The acceptance determiners 6-2 and 6-3 can know the completion of processing on the last received processing request signal on the basis of the data set in the received processing response signal. That is, the transmission scheduler 65 of the acceptance determiners 6-2 and 6-3 can recognize the transmitted processing response signal in the transmission schedule and the actual transmission completion time. In addition, in a case where the determination unit 63 of the acceptance determiners 6-2 and 6-3 selects the server 5 having the smallest current prediction load by the dynamic ratio method in step S2, update for subtracting the load information of the server 5 added to the processing request signal that is the source of the received processing response signal may be performed on the processing load information stored in the storage unit 61.

Figure 10:
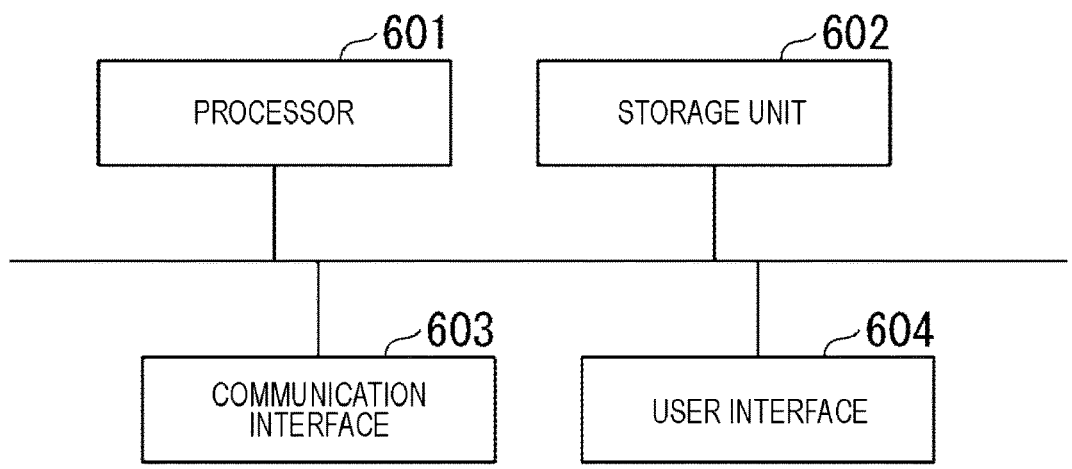
FIG. 10 is a diagram illustrating a hardware configuration of the acceptance determiner according to the first to third embodiments.
Figure 11:
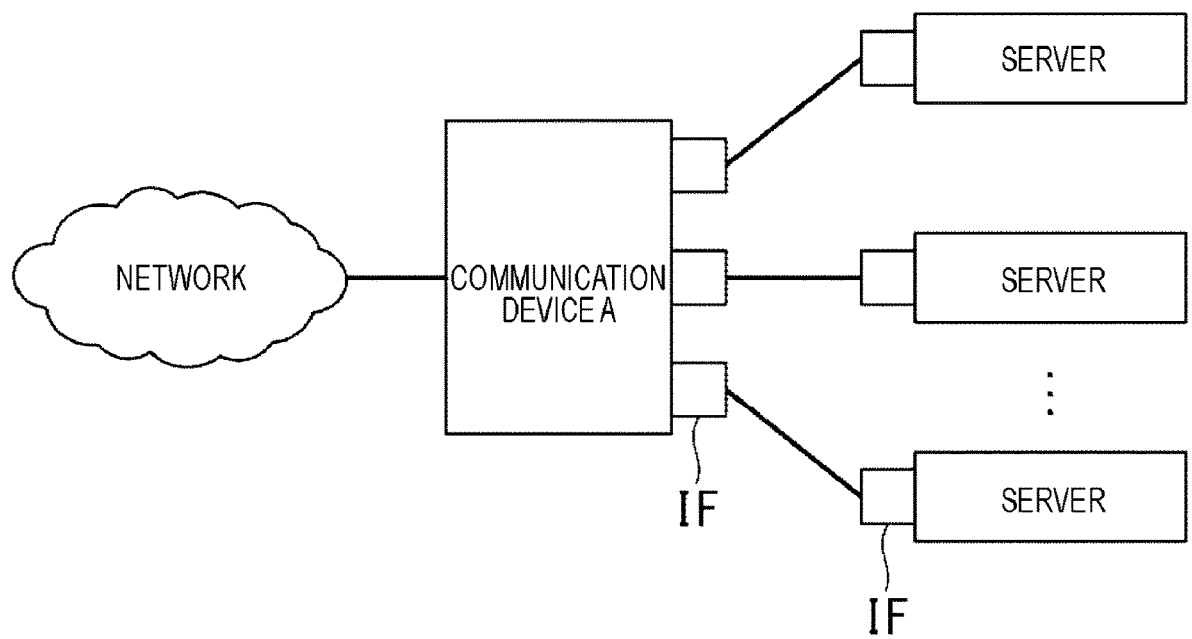
FIG. 11 is a diagram illustrating a configuration example of a conventional network.

Next, a hardware configuration of the acceptance determiner 6 will be described. FIG. 10 is a device configuration diagram illustrating a hardware configuration example of the acceptance determiner 6 according to the first to third embodiments. The acceptance determiner 6 includes a processor 601, a storage unit 602, a communication interface 603, and a user interface 604.

The processor 601 is a central processing device that performs calculation and control. The processor 601 is a CPU or a GPU, for example. The processor 601 reads and executes the program from the storage unit 602. The storage unit 602 further includes a work area and the like to be used when the processor 601 executes various programs. The communication interface 603 is communicatively connected to other devices and other functional units. The user interface 604 is an input device such as buttons, a keyboard, or a pointing device, and a display device such as lamps or a display. Artificial operations are input through the user interface 604.

All or some of the functions of the first buffer 62, the determination unit 63, the transfer unit 64, the transmission scheduler 65, the second buffer 66, and the response output unit 67 of the acceptance determiner 6 are realized by the processor 601 reading and executing a program from the storage unit 602. Note that all or some of these functions may be realized with the use of hardware such as an application specific integrated circuit (ASIC), a programmable logic device (PLD), or an FPGA. The storage unit 61 of the acceptance determiner 6 is realized by the storage unit 602. The transmission/reception interface 60 of the acceptance determiner 6 is realized by the communication interface 603.

In the conventional communication system, in a case where a processing load of a server is distributed, for example, a processing request from a client device is distributed by a communication device such as a load balancer. The performance of the communication device is limited by the communication method of the interface used for the communication device and the switching performance of the switch fabric. Therefore, in a case where performance requirements such as a communication speed for the communication system are increased, it is necessary to renew all the interface units for transmission and reception connecting with the server in addition to the communication device.

According to the above-described embodiments, the optical splitter or the optical hub branches the processing request from the client device without providing a load balancer between the plurality of servers and the client, thereby broadcasting the processing request to each server. The acceptance determiner of the server determines a signal to be accepted by the acceptance determiner itself among the broadcast processing request signals. The server processes the processing request signal determined to be accepted by the acceptance determiner. The acceptance determiner of each server independently determines whether or not to receive the processing request signal so that, for example, only one of all the servers performs processing and further the server that performs processing is switched. In addition, the acceptance determiner of each server predicts the processing load, the processing completion time, and the data amount of the processing response signal generated in each server, thereby performing transmission scheduling so that the processing response signals from the servers do not collide with each other.

Thereby, even in a case where the performance requirements such as the communication speed are changed, it is not necessary to renew the communication device that functions as a load balancer and the transmission/reception interfaces attached to the communication device as in the related art, and it is sufficient if the transmission/reception interfaces of the servers are renewed.

According to the embodiments described above, the communication system includes a branching device, a plurality of acceptance judgement apparatuses connected to the branching device, and processing devices each connected to respective one of the plurality of acceptance judgement apparatuses. The branching device branches a signal addressed to the processing device into a plurality of signals, and broadcasts the branched signals. For example, the branching device is the optical splitter 4 or the optical hub 40 of the embodiment. The acceptance judgement apparatus includes a reception unit, a determination unit, and a transfer unit. The reception unit receives one of a plurality of signals broadcast by the branching device. The determination unit determines whether or not to transfer a first signal that is a signal which has been received by the reception unit to one of the processing devices connected to the own apparatus on the basis of the first signal and one or more second signals that are one or more signals which have been received by the reception unit before the first signal. For example, the first signal is a processing request signal Mi, and the second signals are processing request signals MO to M(i−1). The transfer unit transfers the first signal to one of the processing devices connected to the own apparatus when the determination unit determines to transfer the first signal, and discards the first signal when the determination unit determines not to transfer the first signal. The processing device processes the signal received from the acceptance judgement apparatus. For example, the processing device is the server 5 of the embodiment.

The acceptance judgement apparatus may further include a timing determination unit and a response output unit. The timing determination unit is, for example, the transmission scheduler 65 of the embodiment. The timing determination unit calculates the timing at which one of the processing devices outputs the response signal to the first signal and the data amount of the response signal on the basis of the data set in the first signal, and determines the transmission timing of the response signal using the calculated timing and data amount. When the transfer unit transfers the first signal to one of the processing devices connected to the own apparatus, the response output unit outputs the response signal received from one of the processing devices to the branching device at the transmission timing determined by the timing determination unit. Furthermore, the reception unit may receive a response signal which has been transmitted from one of the processing devices connected to another acceptance judgement apparatus and has been branched by the branching device.

The determination unit may determine whether or not to transfer the first signal to one of the processing devices connected to the own apparatus on the basis of the number of signals which have been received by the reception unit after a predetermined timing. Alternatively, the determination unit may determine whether or not to transfer the first signal to one of the processing devices connected to the own apparatus on the basis of each processing load of each of the processing devices in a case where the first signal is processed in each of the processing devices and each processing load of each of the processing devices in a case where the one or more second signals are processed in each of the processing devices.

Although embodiments of the present invention have been described in detail with reference to the drawings so far, specific configurations are not limited to these embodiments, and include designs and the like without departing from the scope of the invention.

REFERENCE SIGNS LIST

1 Communication system
2 Client device
3 Network
4 Optical splitter
5-1 to 5-3 Server
6-1 to 6-3, 6-n Acceptance determiner
7-1 to 7-3 Processing unit
8 Optical fiber
40 Optical hub
41-0 to 41-2 Optical splitter
60-n Transmission/reception interface
61-n Storage unit
62-n First buffer
63-n Determination unit
64-n Transfer unit
65-n Transmission scheduler
66-n Second buffer
67-n Response output unit
601 Processor
602 Storage unit
603 Communication interface
604 User interface

The invention claimed is:

1. An acceptance judgement apparatus in a communication system including a branching device, a plurality of acceptance judgement apparatuses connected to the branching device and processing devices each connected to respective one of the plurality of acceptance judgement apparatuses and performing processing according to a received signal, the acceptance judgement apparatus comprising:

a receiver configured to receive one of a plurality of signals which have been broadcast by the branching device;

a determiner configured to determine whether or not to transfer a first signal that has been received by the receiver to one of the processing devices connected to the acceptance judgement apparatus on the basis of the first signal and one or more second signals that have been received by the receiver before the first signal;

a transfer device configured to transfer the first signal to one of the processing devices connected to the acceptance judgement apparatus when the determiner determines to transfer the first signal, and to discard the first signal when the determiner determines not to transfer the first signal;

a timing determiner configured to calculate a timing at which one of the processing devices outputs a response signal to the first signal and a data amount of the response signal on the basis of data set in the first signal, and to determine a transmission timing of the response signal using the calculated timing and the calculated data amount; and a response transmitter configured to, when the transfer device has transferred the first signal to one of the processing devices connected to the acceptance judgement apparatus, output the response signal received from one of the processing devices to the branching device at the transmission timing determined by the timing determiner.

2. The acceptance judgement apparatus according to claim 1, wherein the receiver receives a response signal which has been transmitted from one of the processing devices connected to another acceptance judgement apparatus included in the plurality of acceptance judgement apparatuses and has been branched by the branching device.

3. The acceptance judgement apparatus according to claim 1, wherein the determiner determines whether or not to transfer the first signal to one of the processing devices connected to the acceptance judgement apparatus on the basis of the number of signals which have been received by the receiver after a predetermined timing.

4. The acceptance judgement apparatus according to claim 1, wherein the determiner determines whether or not to transfer the first signal to one of the processing devices connected to the acceptance judgement apparatus on the basis of each processing load of each of the processing devices in a case where the first signal is processed in each of the processing devices and each processing load of each of the processing devices in a case where the one or more second signals are processed in each of the processing devices.

5. An acceptance judgement method of an acceptance judgement apparatus in a communication system including a branching device, a plurality of acceptance judgement apparatuses connected to the branching device, and processing devices each connected to respective one of the plurality of acceptance judgement apparatuses and performing processing according to a received signal, the acceptance judgement method comprising:

receiving one of a plurality of signals which have been broadcast by the branching device;

determining whether or not to transfer a first signal that has been received to one of the processing devices connected to the acceptance judgement apparatus on the basis of the first signal and one or more second signals that have been received before the first signal;

transferring the first signal to one of the processing devices connected to the acceptance judgement apparatus upon determining to transfer the first signal, and discarding the first signal upon determining not to transfer the first signal;

calculating a timing at which one of the processing devices outputs a response signal to the first signal and a data amount of the response signal on the basis of data set in the first signal, and determining a transmission timing of the response signal using the calculated timing and the calculated data amount; and when the first signal has been transferred to one of the processing devices connected to the acceptance judgement apparatus, outputting the response signal received from one of the processing devices to the branching device at the determined transmission timing.

\* \* \* \* \*